Dec. 19, 1922.
F. M. SHAW.
PNEUMATIC GASKET.
FILED FEB. 26, 1921.
1,439,452.
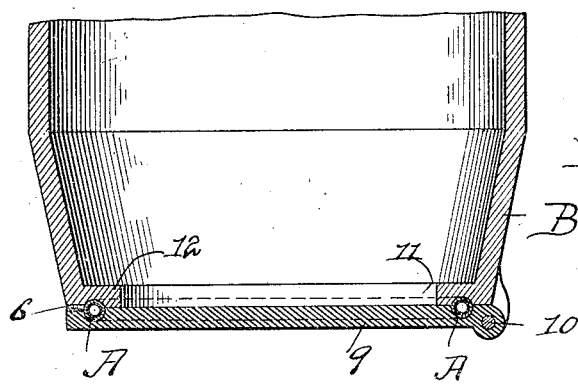
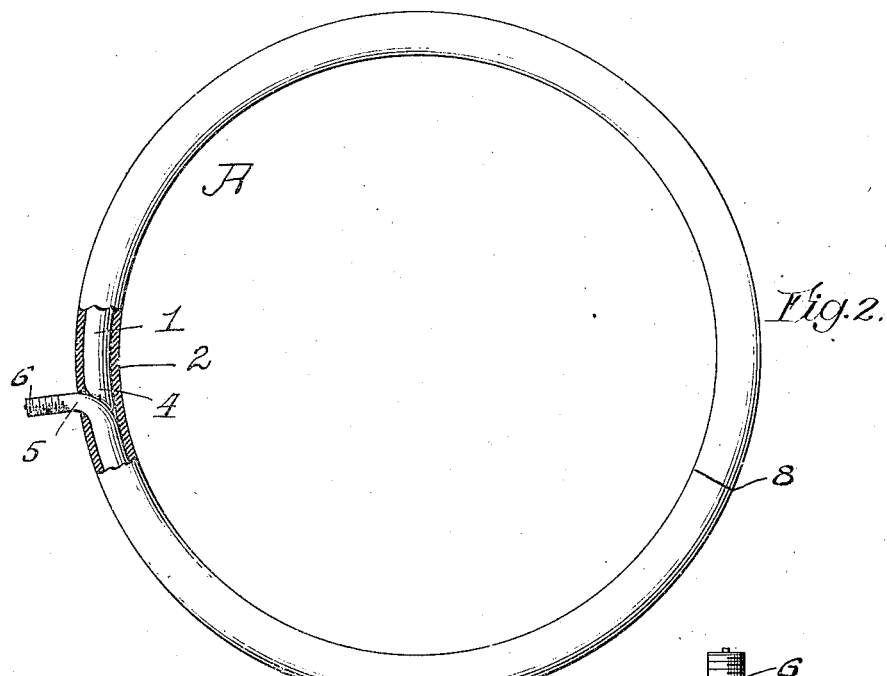
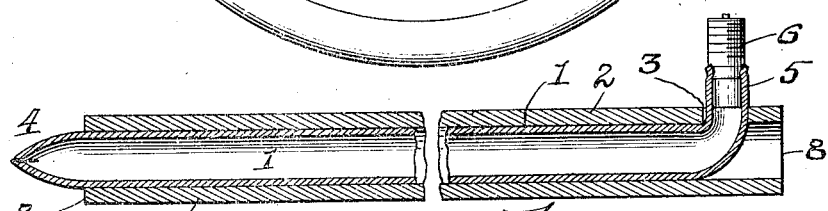
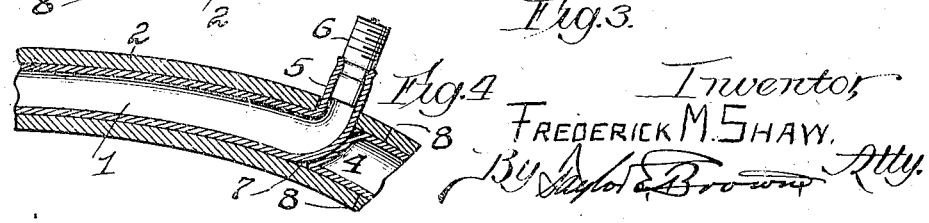

Patented Dec. 19, 1922.

1,439,452

UNITED STATES PATENT OFFICE.

FREDERICK M. SHAW, OF CHICAGO, ILLINOIS.

PNEUMATIC GASKET.

Application filed February 26, 1921. Serial No. 448,231.

*To all whom it may concern:*

Be it known that I, FREDERICK M. SHAW, a citizen of the United States, residing at Chicago, in the county of Cook and State of Illinois, have invented certain new and useful Improvements in Pneumatic Gaskets, of which the following is a specification, reference being had to the accompanying drawings, and to the reference characters marked thereon, which form a part of this specification.

This invention relates to gaskets used for packing joints. In the use of large apparatus, as for example a digestor or condenser having a swinging door or closure to its apertured end, great difficulty has been experienced in properly packing the joint because of the size of the aperture and of the pressure of the material upon the closure or door.

The principal object of my invention is to produce such a packing or gasket as will relieve the particular objection noted and which will be relatively cheap in construction, simple in operation and which will not get out of order. Also one which may be adjusted, so to speak, from time to time, to prevent leakage.

The invention consists in the devices and combination of devices herein illustrated, described and claimed.

In the drawings:

Fig. 1 illustrates in cross section an apparatus to which my improved gasket has been applied.

Fig. 2 is a plan view, enlarged, of the improved gasket, detached, and partly broken away.

Fig. 3 is a vertical sectional view.

Fig. 4 is also a vertical sectional view showing certain details.

In that form of the invention illustrated in the drawings, the gasket is represented as a whole by the letter A. B represents a suitable tubular apparatus or container, such for example as a digestor or condenser, to which the gasket A is applied. The gasket A comprises two main parts, a tubular flexible insert member 1 and a tubular resilient outer or casing member 2. The outer member 2 is provided at a convenient point with an aperture, indicated at 3. One end of the inner member is closed, as shown at 4. The other end 5 of the inner member 1 is adapted to project through the aperture 3 of the casing 1 and is provided with a suitable valve closure 6, for water or air connection. The casing 1 is arranged in ring form, with the end 4 of the inner member in juxtaposition to the other part of the inner member at or near the end 5. The abutting ends 8 of the casing 1 are joined together.

9 is a door or other closure, pivotally mounted at 10, to the condenser B, and adapted to close the aperture or mouth 11 of the apparatus. An interiorly directed flange 12 affords on its lower face a bearing for the door or closure 9, and between the flange 12 and the door 9, the gasket A is placed. A suitable annular groove or recess is complementally arranged in the face of the door 9 and the lower surface of the flange 12. The gasket A will lie in the recess in such manner that the valve end 5, 6, of the inner casing, is available for manipulation when it is desired to adjust the gasket.

In practice, I prefer to make the outer casing of resilient, but relatively stiff tubular material, such as that of which the familiar rubber hose is made. I prefer also to secure the abutting ends 8, 8, together by vulcanization, which is a process so well known as to require no description here. I also prefer to construct the insert member 1 of more flexible or resilient and expansible material, such as a lighter grade of hose or rubber tubing. The valved part and end 4 may be secured in position by vulcanization in a familiar manner.

The insert member 1 may be expanded so as to completely fill the tube of the outer casing, by placing any suitable air or water forcing apparatus upon the valved end 6. The particular form of air or water inlet valve apparatus indicated by the letter 6 is not essential, and therefore details are omitted.

It has been found after somewhat extensive use of this two-member tubular gasket A, in large apparatus such as the condenser B, where the opening or aperture 11 is four or five feet in diameter, that a prefectly airtight packing is afforded by the construction herein shown and described. While changes may be made as to some of the details, yet the form and arrangement herein illustrated are recommended as highly satisfactory in use.

I claim as my invention:

1. A gasket comprising a tubular, resilient, but relatively stiff outer casing, an aperture through one wall thereof, and a tubular, flexible insert in the casing, one end of which protrudes through said aperture, the other end of the insert being closed.

2. A gasket comprising a tubular, resilient, but relatively stiff outer casing, an aperture through one wall thereof, and a tubular, flexible insert in the casing, one end of which protrudes through said aperture, the other end of the insert being closed, said insert and said casing being made of rubber.

3. A gasket comprising a tubular, resilient, but relatively stiff outer casing, an aperture through one wall thereof, and a tubular, flexible insert in the casing, one end of which protrudes through said aperture, the other end of the insert being closed, and secured by vulcanization to the insert near the projecting part thereof.

4. A gasket comprising a tubular, resilient, but relatively stiff outer casing, an aperture through one wall thereof, and a tubular, flexible insert in the casing, one end of which protrudes through said aperture, a valved closure for said protruding end, the other end of the insert being closed.

5. A gasket comprising a tubular, resilient, but relatively stiff outer casing, an aperture through one wall thereof, and a tubular, inflatable insert in the casing, one end of which protrudes through said aperture, the other end of the insert being closed.

6. A gasket comprising a tubular, resilient, but relatively stiff outer casing, an aperture through one wall thereof, and a tubular, inflatable insert in the casing, one end of which protrudes through said aperture, a valved closure for said protruding end, the other end of the insert being closed.

7. A gasket comprising a relatively stiff, tubular, rubber outer member, such as a hose, bent into a ring with its abutting ends joined by vulcanization and having an aperture through its wall, a resilient, expansible rubber member inserted within said outer member, with one end closed and its other end projecting through said aperture and a valve in said projecting end of the inner member, the two members being suitably held secured together by vulcanization.

In testimony that I claim the foregoing as my invention I affix my signature, in the presence of two witnesses, this 17th day of February, 1921.

FREDERICK M. SHAW.

Witnesses:
W. S. SHAW,
C. G. SAUNDERS.